US009288734B2

(12) United States Patent
Jha et al.

(10) Patent No.: US 9,288,734 B2
(45) Date of Patent: Mar. 15, 2016

(54) TRAFFIC SPLITTING BASED ON LATENCY BETWEEN CELLS

(71) Applicant: Intel Corporation, Santa Clara, CA (US)

(72) Inventors: Satish Chandra Jha, Hillsboro, OR (US); Maruti Gupta, Portland, OR (US); Ali Koc, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 14/137,243

(22) Filed: Dec. 20, 2013

(65) Prior Publication Data

US 2014/0362704 A1 Dec. 11, 2014

Related U.S. Application Data

(60) Provisional application No. 61/832,644, filed on Jun. 7, 2013.

(51) Int. Cl.
*H04W 36/22* (2009.01)
*H04W 28/02* (2009.01)
(Continued)

(52) U.S. Cl.
CPC .............. *H04W 36/22* (2013.01); *H04L 5/0032* (2013.01); *H04L 5/0055* (2013.01); *H04L 5/14* (2013.01); *H04N 21/24* (2013.01); *H04N 21/2401* (2013.01); *H04N 21/26208* (2013.01); *H04W 28/0289* (2013.01); *H04W 28/085* (2013.01); *H04W 36/24* (2013.01); *H04W 36/30* (2013.01); *H04W 52/0212* (2013.01);
(Continued)

(58) Field of Classification Search
None
See application file for complete search history.

(56) References Cited

U.S. PATENT DOCUMENTS

2005/0185651 A1   8/2005   Rinne
2005/0262261 A1   11/2005   Deshpande
(Continued)

FOREIGN PATENT DOCUMENTS

CN   105164949 A   12/2015
CN   105165096 A   12/2015
(Continued)

OTHER PUBLICATIONS

"Discussion on S1 split for dual-connectivity", Interdigital Communications, R2-131326, 3GPP TSG-RAN WG2 #81bis, Chicago, USA, [Online] retrieved from the internet: <http://www.3gpp.org/ftp/tsg_ran/wg2_rl2/TSGR2_81bis/Docs/>, (Apr. 15-19, 2013).
(Continued)

*Primary Examiner* — Chirag Shah
*Assistant Examiner* — Suk Jin Kang
(74) *Attorney, Agent, or Firm* — Schwegman Lundberg & Woessner, P.A.

(57) ABSTRACT

Systems and techniques for traffic splitting based on latency between cells are herein described. At an eNodeB, a transmission path latency for a portion of a transmission path between the eNodeB and a user equipment (UE) may be measured via a secondary eNodeB when the UE is dually connected to both the eNodeB and the secondary eNodeB. The transmission path latency may be compared to a threshold. A layer in a transmission stack to split traffic to the UE may be determined based on the comparison of the transmission path latency to the threshold, the traffic being split between the eNodeB and the secondary eNodeB.

21 Claims, 6 Drawing Sheets

(51) Int. Cl.

| | | |
|---|---|---|
| *H04N 21/24* | (2011.01) | |
| *H04W 28/08* | (2009.01) | |
| *H04L 5/00* | (2006.01) | |
| *H04L 5/14* | (2006.01) | |
| *H04W 72/04* | (2009.01) | |
| *H04W 52/02* | (2009.01) | |
| *H04W 36/30* | (2009.01) | |
| *H04W 36/24* | (2009.01) | |
| *H04W 36/14* | (2009.01) | |
| *H04W 36/36* | (2009.01) | |
| *H04W 84/12* | (2009.01) | |
| *H04N 21/262* | (2011.01) | |

(52) U.S. Cl.
  CPC ......... *H04W 72/0406* (2013.01); *H04W 28/08* (2013.01); *H04W 36/14* (2013.01); *H04W 36/36* (2013.01); *H04W 84/12* (2013.01); *Y02B 60/50* (2013.01)

(56) References Cited

U.S. PATENT DOCUMENTS

| | | |
|---|---|---|
| 2006/0019662 A1 | 1/2006 | Andrews et al. |
| 2007/0025304 A1 | 2/2007 | Leelahakriengkrai et al. |
| 2008/0220788 A1 | 9/2008 | Stanwood et al. |
| 2009/0111468 A1 | 4/2009 | Burgess et al. |
| 2009/0113086 A1 | 4/2009 | Wu et al. |
| 2009/0124245 A1 | 5/2009 | Somasundaram et al. |
| 2010/0135166 A1 | 6/2010 | Ahluwalia |
| 2010/0169732 A1 | 7/2010 | Wu |
| 2010/0329198 A1 | 12/2010 | Madan et al. |
| 2011/0053585 A1 | 3/2011 | Otonari |
| 2011/0090802 A1 | 4/2011 | Kotrla et al. |
| 2011/0136446 A1 | 6/2011 | Komninakis et al. |
| 2011/0261750 A1 | 10/2011 | Fujito et al. |
| 2011/0310816 A1 | 12/2011 | Kim et al. |
| 2011/0317560 A1 | 12/2011 | Aramoto et al. |
| 2012/0057478 A1 | 3/2012 | Bránnstróm et al. |
| 2012/0076040 A1 | 3/2012 | Hoshino et al. |
| 2012/0087275 A1 | 4/2012 | Zhang et al. |
| 2012/0131204 A1 | 5/2012 | Song |
| 2012/0178441 A1 | 7/2012 | Shaheen et al. |
| 2013/0028165 A1 | 1/2013 | Kim et al. |
| 2013/0077543 A1 | 3/2013 | Kim et al. |
| 2013/0083721 A1 | 4/2013 | Wu et al. |
| 2013/0142136 A1 | 6/2013 | Pi et al. |
| 2013/0166644 A1* | 6/2013 | Sun et al. ............... 709/204 |
| 2013/0176988 A1* | 7/2013 | Wang et al. ............ 370/331 |
| 2013/0308473 A1 | 11/2013 | Sun et al. |
| 2013/0325684 A1* | 12/2013 | Vogler et al. ............ 705/37 |
| 2013/0343252 A1 | 12/2013 | Chakraborty et al. |
| 2013/0343293 A1 | 12/2013 | Jersenius et al. |
| 2014/0029581 A1 | 1/2014 | Schatzmayr |
| 2014/0036873 A1 | 2/2014 | Cheng et al. |
| 2014/0064292 A1 | 3/2014 | Binetti et al. |
| 2014/0122656 A1* | 5/2014 | Baldwin et al. .......... 709/219 |
| 2014/0171069 A1 | 6/2014 | Pang et al. |
| 2014/0204771 A1* | 7/2014 | Gao et al. ............... 370/252 |
| 2014/0287717 A1 | 9/2014 | Golaup et al. |
| 2014/0301241 A1* | 10/2014 | Kumar et al. ........... 370/254 |
| 2014/0302853 A1 | 10/2014 | Militano et al. |
| 2014/0362689 A1 | 12/2014 | Koc et al. |
| 2014/0362745 A1 | 12/2014 | Davydov et al. |
| 2014/0362752 A1 | 12/2014 | Jha et al. |
| 2014/0362829 A1 | 12/2014 | Kazmi et al. |
| 2014/0366069 A1 | 12/2014 | Ramamurthi et al. |
| 2014/0370906 A1 | 12/2014 | Lundborg et al. |
| 2015/0020157 A1 | 1/2015 | Kim et al. |
| 2015/0109993 A1 | 4/2015 | Kojima |
| 2015/0156743 A1 | 6/2015 | Lee et al. |

FOREIGN PATENT DOCUMENTS

| | | |
|---|---|---|
| CN | 105191418 A | 12/2015 |
| CN | 105230085 A | 1/2016 |
| CN | 105247919 A | 1/2016 |
| KR | 1020110071406 A | 6/2011 |
| TW | 201505461 A | 2/2015 |
| TW | 201517645 A | 5/2015 |
| WO | WO-2011100492 A1 | 8/2011 |
| WO | WO-2012053840 A2 | 4/2012 |
| WO | WO-2012153961 A2 | 11/2012 |
| WO | WO-2013051975 A1 | 4/2013 |
| WO | WO-2014049198 A1 | 4/2014 |
| WO | WO-2014197493 A1 | 12/2014 |
| WO | WO-2014197501 A1 | 12/2014 |
| WO | WO-2014197571 A1 | 12/2014 |
| WO | WO-2014197576 A1 | 12/2014 |
| WO | WO-2014197682 A1 | 12/2014 |
| WO | WO-2014197719 A1 | 12/2014 |

OTHER PUBLICATIONS

"Evolved Universal Terrestrial Radio Access (E-UTRA) and Evolved Universal Terrestrial Radio Access Network (E-UTRAN); Overall description; Stage 2", 3GPP TS 36.300 version 10.8.0 Release 10., (Jul. 2012), 210 pgs.

"Evolved Universal Terrestrial Radio Access (E-UTRA); Radio Resource Control (RRC); Protocol specification", 3GPP TS 36.331 version 10.6.0 Release 10., (Jul. 2012), 306 pgs.

"Evolved Universal Terrestrial Radio Access Network (E-UTRAN): Architecture description", 3GPP TS 36.401 version 10.4.0 Release 10, (2012), 22 pgs.

"International Application Serial No. PCT/US2014/040734, International Search Report mailed Sep. 12, 2014", 5 pgs.

"International Application Serial No. PCT/US2014/040734, Written Opinion mailed Sep. 12, 2014", 8 pgs.

"International Application Serial No. PCT/US2014/040743, International Search Report mailed Sep. 24, 2014", 3 pgs.

"International Application Serial No. PCT/US2014/040743, Written Opinion mailed Sep. 24, 2014", 5 pgs.

"International Application Serial No. PCT/US2014/040877, International Search Report mailed Sep. 25, 2014", 4 pgs.

"International Application Serial No. PCT/US2014/040877, Written Opinion mailed Sep. 25, 2014", 4 pgs.

"International Application Serial No. PCT/US2014/040882, International Search Report mailed Sep. 25, 2014", 3 pgs.

"International Application Serial No. PCT/US2014/040882, Written Opinion mailed Sep. 25, 2014", 5 pgs.

"International Application Serial No. PCT/US2014/041068, International Search Report mailed Sep. 26, 2014", 3 pgs.

"International Application Serial No. PCT/US2014/041068, Written Opinion mailed Sep. 26, 2014", 5 pgs.

"International Application Serial No. PCT/US2014/041142, International Search Report mailed Oct. 1, 2014", 3 pgs.

"International Application Serial No. PCT/US2014/041142, Written Opinion mailed Oct. 1, 2014", 6 pgs.

"Mobility for dual connectivity", R2-130990, 3GPP TSG RAN WG2 Meeting #81bis, (2013).

"Power Preference Indication and Qos Requirements", ZTE Corporation, R2-130131 in 3GPP TSG-RAN WG2 Meeting #81 St Julians. Malta, (Jan. 28,-Feb. 1, 2013).

"Radio link failure handling for dual connectivity", R2-131990, 3GPP TSG RAN WG2 Meeting #82, (May 2013), 1-2.

"Resource Coordination for Small Cells with Non-Ideal Backhaul", Samsung, R1-131027, 3GPP TSG RAN WG1 #72bis, Chicago, USA, (Apr. 15, 2013), 1-2.

"Transparent End-to-End Packet-Switched Streaming Service (PSS) :Progressive Download and Dynamic Adaptive Streaming over HTTP(3GP-DASH)", 3GPP TS 26.247 V 11.5.0 Release 11, (2013), 119 pgs.

"UP Radio Procotol for Dual Connecivity", LG Electronics Inc., R2-131231, 3GPP TSG-RAN2 Meeting #81bis, (Apr. 2013), 1-7.

"User Plane Architecture for Dual-Connectivity", R2-131939, 3GPP TSG-RAN WG2 #82, (May 2013).

(56) References Cited

OTHER PUBLICATIONS

Andrews, M., et al., "Optimal utility based multi-user throughput allocation subject to throughput constraints", IEEE INFOCOM vol. 4, (2005), 2415-2424.

Jalali, A, et al., "Data throughput of CDMA-HDR a high efficiency-high data rate personal communication wireless system", IEEE 51st Vehicular Technology Conference vol. 03, (2000), 1854-1858.

Liu, X., et al., "A framework for opportunistic scheduling in wireless networks", Computer Networks vol. 41, (2003), 451-475.

Lui, X., et al., "Opportunistic transmission scheduling with resource-sharing constraints in wireless networks", IEEE Selected Areas in Communications vol. 19 (10), (2006), 2053-2064.

Singh, S., et al., "Video capacity and QoE enhancements over LTE", IEEE International Conference on Communications (ICC), (2012), 7071-7076.

Stolyar, A. L., "On the Asymptotic Optimality of the Gradient Scheduling Algorithm for Multiuser Throughput Allocation", Operations Research vol. 53, (2005), 12-25.

"U.S. Appl. No. 14/104,725, Response filed Oct. 5, 2015 to Restriction Requirement mailed Aug. 4, 2015", 8 pgs.

"U.S. Appl. No. 14/104,725, Restriction Requirement mailed Aug. 4, 2015", 9 pgs.

"U.S. Appl. No. 14/109,283, Non Final Office Action mailed Jul. 8, 2015", 14 pgs.

"U.S. Appl. No. 14/134,985, Non Final Office Action mailed Sep. 1, 2015", 30 pgs.

"U.S. Appl. No. 14/140,827, Non Final Office Action mailed Aug. 13, 2015", 16 pgs.

"U.S. Appl. No. 14/140,827, Response filed Jun. 19, 2015 to Restriction Requirement mailed Apr. 20, 2015", 8 pgs.

"U.S. Appl. No. 14/140,827, Restriction Requirement mailed Apr. 20, 2015", 7 pgs.

"U.S. Appl. No. 14/141,940, Examiner Interview Summary mailed Jul. 29, 2015", 3 pgs.

"U.S. Appl. No. 14/141,940, Non Final Office Action mailed May 22, 2015", 23 pgs.

"U.S. Appl. No. 14/141,940, Notice of Allowability mailed Sep. 8, 2015", 2 pgs.

"U.S. Appl. No. 14/141,940, Notice of Allowance mailed Aug. 10, 2015", 9 pgs.

"U.S. Appl. No. 14/141,940, Response filed Jul. 7, 2015 to Non Final Office Action mailed May 22, 2015", 23 pgs.

"Issues on extended paging cycle in RRC_IDLE", LG Electronics Inc. 3GPP TSG-RAN WG2 #82 R2-131890, (May 20-24, 2013), 3 pgs.

"Backhaul Considerations for User Plane Architectures for Dual Connectivity", Qualcomm Incorporated, R2-131158, 3GPP TSG-RAN2 #81bis, Chicago, USA, [Online] retrieved from the internet: <http://www.3gpp.org/f tp/tsg_ran/wg2_r12/TSGR2_81bis/Docs/>, (Apr. 15-19, 2013), 1-3.

"Correction on implicit HARQ-ACK Resource Determination for PUCCH for Mat 1b with Channel Selection for TDD CA with Different UL-DL Configurations", CATT, R1-132691, 3GPP TSG-RAN WG1 Meeting #73, Fukuoka, Japan, (May 20, 2013), 2-4.

"Correction on UARQ-ACK Transmission for a UE con figured with PUCCH Format 3", Intel Corporation, R1-132684, 3GPP TSG-WG1 Meeting #73, Fukuoka, Japan, (May 20, 2013), 4-5.

"International Application Serial No. PCT/US2014/040734, International Preliminary Report on Patentability mailed Dec. 17, 2015", 10 pgs.

"International Application Serial No. PCT/US2014/040743, International Preliminary Report on Patentability mailed Dec. 17, 2015", 7 pgs.

"International Application Serial No. PCT/US2014/040877, International Preliminary Report on Patentability mailed Dec. 17, 2015", 6 pgs.

"International Application Serial No. PCT/US2014/041068, International Preliminary Report on Patentability mailed Dec. 17, 2015", 7 pgs.

"International Application Serial No. PCT/US2014/041142, International Preliminary Report on Patentability mailed Dec. 17, 2015", 8 pgs.

"Taiwanese Application Serial No. 103119568, Response filed Dec. 16, 2015 Office Action mailed Sep. 22, 2015", W/ English Claims, 14 pgs.

"Taiwan Application Serial No. 103119401, Office Action mailed Aug. 20, 2015".

"Architectures for dual connesctivty", 3GPP TSG RAN WG2 Meeting #81bis, R2-130989 (Apr. 2013), 6 pgs.

"Impacts of Splitting a Single EPS Bearer Between Two (or more) eNBs", 3GPP TSG RAN WG2 Meeting #81bis, R2-131529 (Apr. 2013), 5pgs.

\* cited by examiner

TRAFFIC SPLITTING BASED ON LATENCY BETWEEN CELLS

PRIORITY APPLICATION

This application claims the benefit of priority to U.S. Provisional Patent Application Ser. No. 61/832,644, filed Jun. 7, 2013, which is incorporated herein by reference in its entirety.

TECHNICAL FIELD

Embodiments described herein generally relate to cellular network routing more specifically to traffic splitting based on latency between cells.

BACKGROUND

Cellular radio networks employ a variety of radio devices, covering physical areas (e.g., of land) called cells, to interfaces between user equipment (UE) and a data (e.g., packets, voice, etc.) network. The 3rd Generation Partnership Project (3GPP) is a standards body that has standards for cellular networks. 3GPP release 8 is also known as Long Term Evolution (LTE) and release 10 and beyond is also known as LTE advanced (LTE-A).

Some 3GPP implementations consider very dense deployments of low-power LTE base stations that have smaller transmission ranges than the traditional transmission ranges of macro cells (e.g., a traditional cell). These low-power cells may be called Small Cells. Small Cells may overlay (e.g., overlap, be found within, etc.) existing macro cell deployment. In generally, each cell includes an eNodeB (e.g., eNB, E-UTRAN Node B, Evolved Node B, etc.) that controls the radio Air Interface with UEs, and may include some control functionality. The Xn interface is used to communicate between eNodeBs.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

In some cellular networks, the UE may be connected to more than one cell (e.g., eNodeB) simultaneously, which is termed "dual connectivity" or "dually connected." In dual connectivity, one eNodeB may be called the master eNodeB (e.g., MeNodeB, Me-NodeB, MeNB, etc.). In an example, the master eNodeB may be where the S1-MME (e.g., S1 control plane) communication terminates from a serving gateway (S-GW). The MeNodeB may act as the mobility anchor for the core network (CN). The other eNodeBs in dual connectivity may be called secondary eNodeBs (e.g., SeNodeB, Se-NodeB, SeNB, etc.).

In an example, the S1-MME (in the control plane) terminates at MeNodeB, user plane communications (e.g., S1-U) may terminate at MeNodeB only, or may terminate at both the MeNodeB and the SeNodeB. Terminating the S1-U at MeNodeB only may keep CN signaling lower. In this case—of terminating the S1-U at MeNodeB only—an Evolved Packet System (EPS) bearer may be split between the MeNodeB and the SeNodeB to the UE. In an example, the splitting may be done at different communication stack layers (levels). For example, the split may occur at the packet data convergence protocol (PDCP) layer. In an example, the split may be done at the radio link control (RLC) layer.

In an example, latency over the Xn interface may vary widely based on the actual back-haul implementation between eNodeBs (e.g., MeNodeB and SeNodeB). Splitting the EPS bearer at the RLC layer may be efficient when end-to-end latency for the path MeNodeB→SeNodeB→UE is lower because RLC segments may need to be reordered and aggregated within specified time duration. However, when those latencies are higher, splitting the EPS bearer at the PDCP layer may be more efficient.

Given the above, testing the latency, for example, of the MeNodeB→SeNodeB→UE latency of the Xn interface and then selecting the appropriate transmission stack layer to split traffic provides a flexible and efficient solution to the problems discussed above. A ping may be sent via the above indicated path. A response to the ping message may be used to compare the latency against a threshold. This comparison may then be used as the basis for which to select the transmission stack layer (e.g., network layer) to split traffic between the cells (e.g., macro cell and small cell).

Thus, in an example, a message exchange mechanism may be used to estimate the latency over the Xn-interface. In response to the latency estimate, bearer between MeNodeB and SeNodeB may be selectively split based on the Xn-interface latency. Further, by periodically updating the latency estimate, the bearer splitting may be adaptable based on the end-to-end latency for the path MeNodeB→SeNodeB→UE over time.

In an example, the latency calculation (e.g., determination, estimate, etc.) may include:

a. MeNodeB sends a ping message (PDCP packet with start/sent time stamp) via SeNodeB related to Xn-interface for which latency is being measured.

b. UE notes the received time and calculates the MeNodeB→SeNodeB→UE path latency in downlink (DL).

c. UE sends reply ping message to MeNodeB via the same SeNodeB with a start (e.g., sent) time stamp. Inside this uplink (UL) ping message UE includes the calculated DL MeNodeB→SeNodeB→UE path latency.

d. MeNodeB notes the received time of UL ping message and calculates UL UE→SeNodeB→MeNodeB path latency.

In an example, the latency may be measured between the MeNodeB and the SeNodeB only (e.g., omitting the UE and UE links). The bearer selection or adaptation (as described below) may then be done based on only the Xn-interface delay.

In an example, bearer (e.g., EPS bearer) split selection may include, based on the values of DL MeNodeB→SeNodeB→UE path latency and UL UE→SeNodeB→MeNodeB path latency, the MeNodeB may select the bearer splitting. For example, if both of the UL and DL latency measurements are greater than a threshold (e.g., twice of RLC Segments Reordering Timer), the MeNodeB may select PDCP layer bearer splitting. Otherwise, the MeNodeB may select RLC layer splitting.

In an example, the bearer splitting may be adaptive. For example, the latency calculation (e.g., operations a-d above) may be performed periodically (e.g., every second, minute, etc.) to update the latency information. The updated latency information may be used to adapt the selection of RLC versus PDCP bearer splitting. Accordingly, changes in networking conditions may be automatically dealt with via this adaptive bearer splitting.

Figure 1:
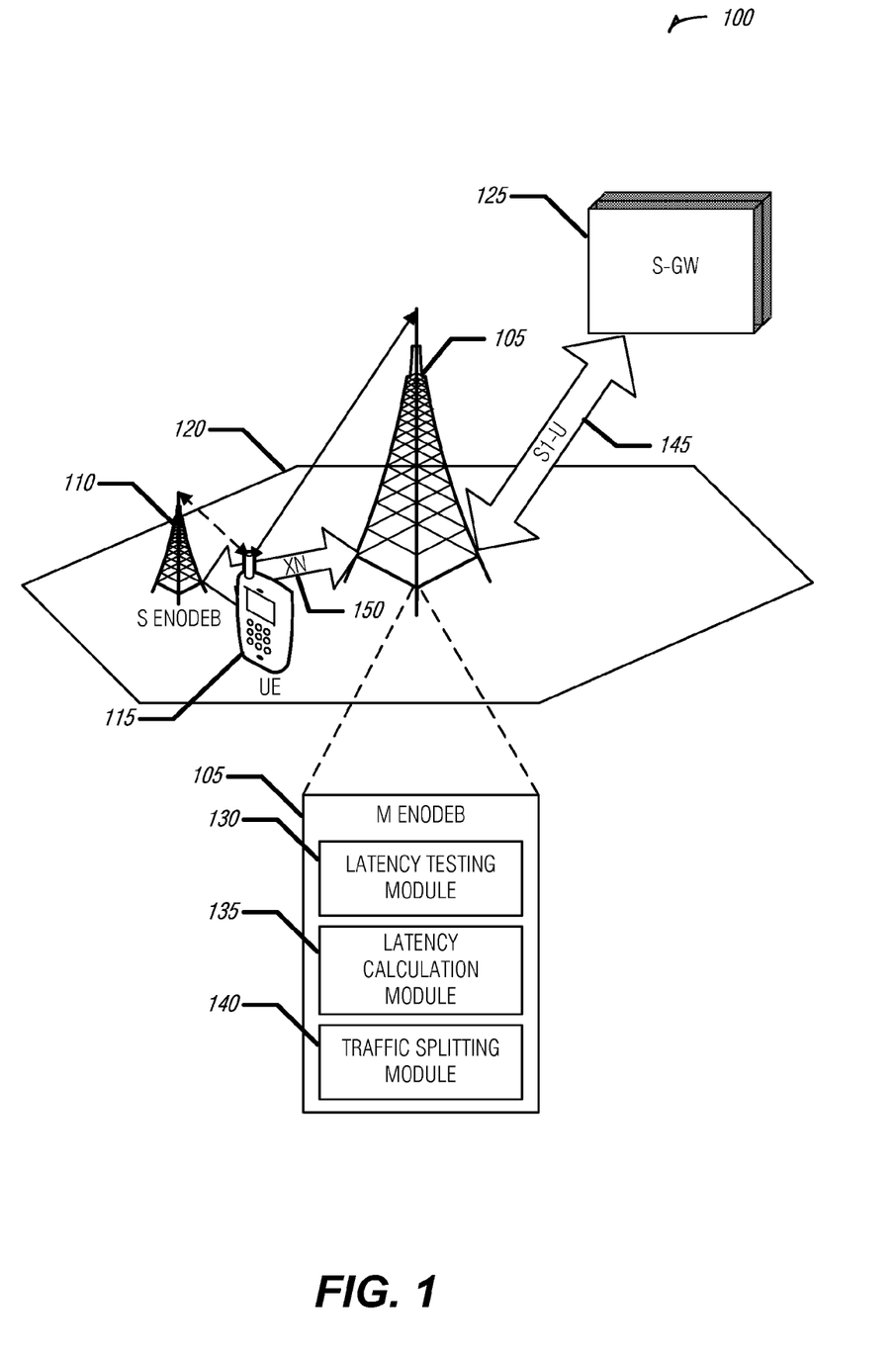
FIG. 1 is a block diagram of an example of an environment and system for traffic splitting based on latency between cells, according to an embodiment.

FIG. 1 is a block diagram of an example of an environment and system 100 for traffic splitting based on latency between cells. The system 100 may include an eNodeB 105 (e.g., MeNodeB) serving cell 120. The system 100 may also include an SeNodeB 110 that serves the UE 115 along with the eNodeB 105. The system 100 may include an S-GW 125. In an example, the S-GW operates in accordance with a 3GPP LTE or A-LTE family of standards (e.g., release 8 or later, or release 11 or later, such as release 12). As illustrated, the S1-U 145 interface communication terminates at the eNodeB 105. Also, the Xn interface 150 connects the eNodeB 105 and the SeNodeB 110. As used herein, communications flowing between the eNodeB 105 and the SeNodeB 110 occur over the Xn 150 interface.

The eNodeB 105 may include a latency testing module 130, a latency calculation module 135, and a traffic splitting module 140. These modules are implemented in hardware as described below with respect to FIG. 6.

The latency testing module 130 may be arranged to measure a transmission path latency for a portion of a transmission path between the eNodeB and a UE 115 via the SeNodeB 110 when the UE 115 is dually connected to both the eNodeB 105 and the SeNodeB 110. Thus, the eNodeB 105 is an MeNodeB as illustrated in FIG. 1.

The latency calculation module 135 may be arranged to compare the transmission path latency to a threshold. In an example, the threshold may be any predetermined value (e.g., number), set, for example, by an administrator of the network. In an example, to compare the transmission path latency to the threshold may include a determination that the transmission path latency is greater than the threshold. In an example, to compare the transmission path latency to the threshold includes a determination that the transmission path latency is less-than-or-equal-to the threshold. In an example, any such value comparison giving selection criteria to the threshold may be used.

In an example, the latency calculation module 135 may be arranged to send a ping message over the portion of the transmission path. In an example, the latency calculation module 135 may be arranged to receive a response to the ping message. In an example, the response to the ping message may include a calculated latency by an end-point-recipient. In an example, the end-point-recipient may be the UE 115. In an example, the end-point-recipient may be the SeNodeB 110. In an example, the ping message is a PDCP packet with a start time stamp.

The traffic splitting module 140 may be arranged to determine a layer in a transmission stack to split traffic to the UE 115 based on the comparison of the transmission path latency to the threshold. As used throughout, the traffic is being split between the eNodeB 105 and the SeNodeB 110. In an example, the layer of the transmission stack is either a PDCP layer or an RLC layer. In an example, the PDCP layer may be selected when the latency is greater than the threshold. In an example, the RLC layer may be selected when the latency is below, or equal to, the threshold.

The eNodeB 105 may optionally include an adaption module that bay be arranged to periodically invoke the latency testing module 130, the latency calculation module 135, and the traffic splitting module 140. Thus, the adaption module may manage a periodic updating of the latency information and subsequent bearer split decisions based on the updated information.

Figure 2:
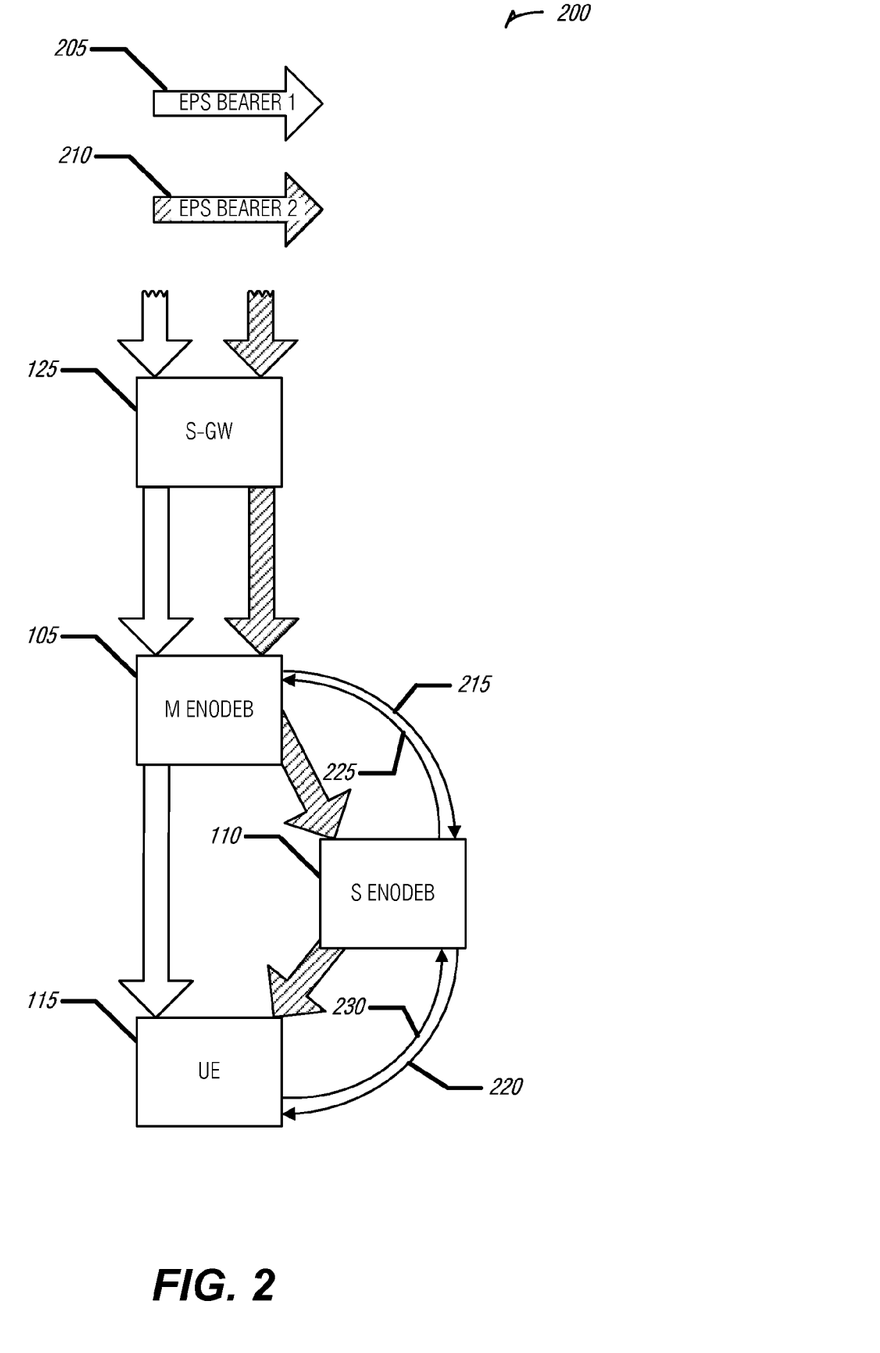
FIG. 2 illustrates a system diagram showing communications and traffic splitting between various components, according to an embodiment.

FIG. 2 illustrates a system diagram 200 showing communications and traffic splitting between various components. As shown, the EPS bearer is split between the EPS bearer 1 205 and EPS bearer 2 210. The EPS bearers 205 and 210 pass through the S-GW 125 and into the eNodeB 105. From there, EPS bearer 205 is connected directly to the UE 115 while EPS bearer 210 is routed through the SeNodeB 110 before connecting to the UE 115.

The Path 215 represents the MeNodeB→SeNodeB connection. The Path 220 represents the SeNodeB→UE connection. The Path 230 represents the UE→SeNodeB connection. The Path 225 represents the SeNodeB→MeNodeB connection. Thus, DL MeNodeB→SeNodeB→UE path latency involves the Paths 215 and 220 while UL UE→SeNodeB→MeNodeB path latency involves the Paths 230 and 225. Only the Paths 215 and 225 are used in the Xn only latency measurement described above.

Figure 3A:
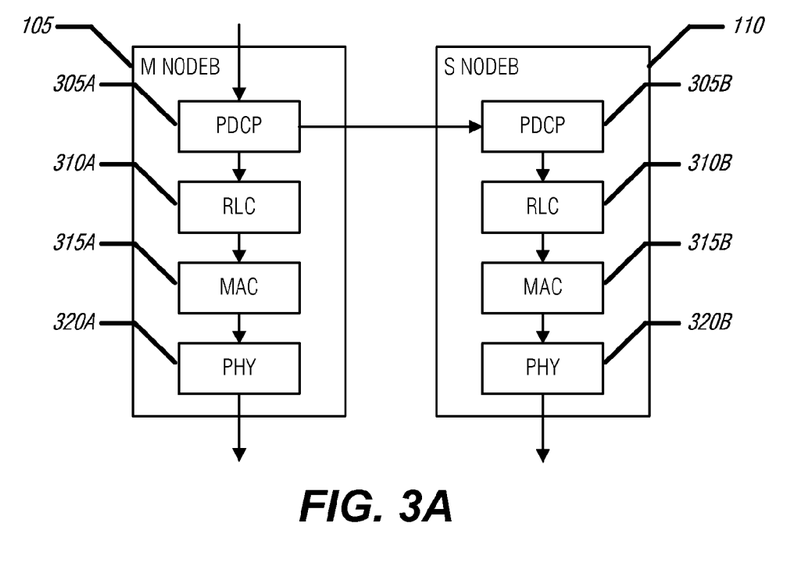
FIGS. 3A and 3B illustrate system diagrams of two example traffic splitting flows at different transmission stack layers, according to an embodiment.
Figure 3B:
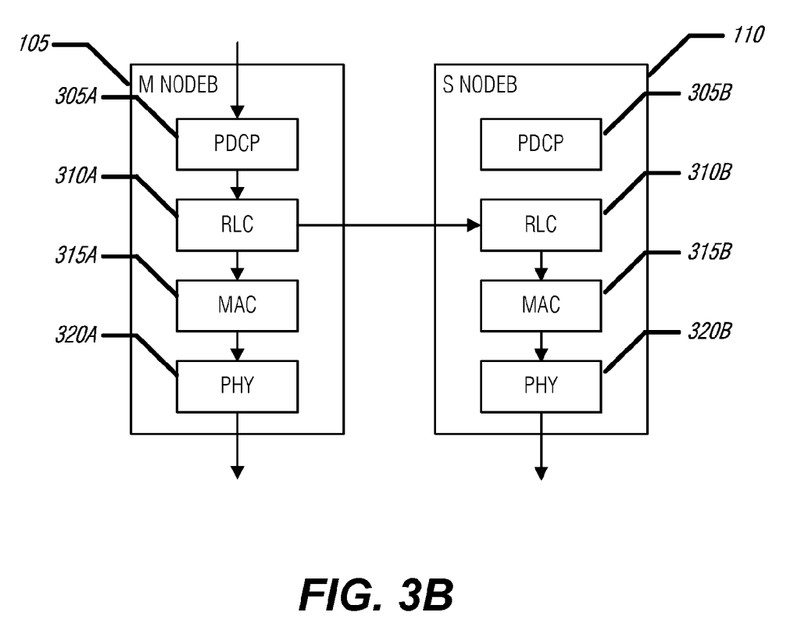

FIGS. 3A and 3B illustrate system diagrams of two example traffic splitting flows at different transmission stack layers. The arrows indicate traffic flow. Although shown in the DL, a similar illustration with the arrows reversed represents the UL. Traffic splitting, as described herein, may be in one or both the DL and UL directions. Both FIGS. 3A and 3B illustrate network transmission stacks in accordance with a 3GPP A-LTE family of standards. FIG. 3A illustrates splitting the traffic at the PDCP layer. FIG. 3B illustrates splitting the traffic at the RLC layer. Both FIGS. 3A and 3B illustrate network transmission stacks in accordance with a 3GPP A-LTE family of standards.

Figure 4:
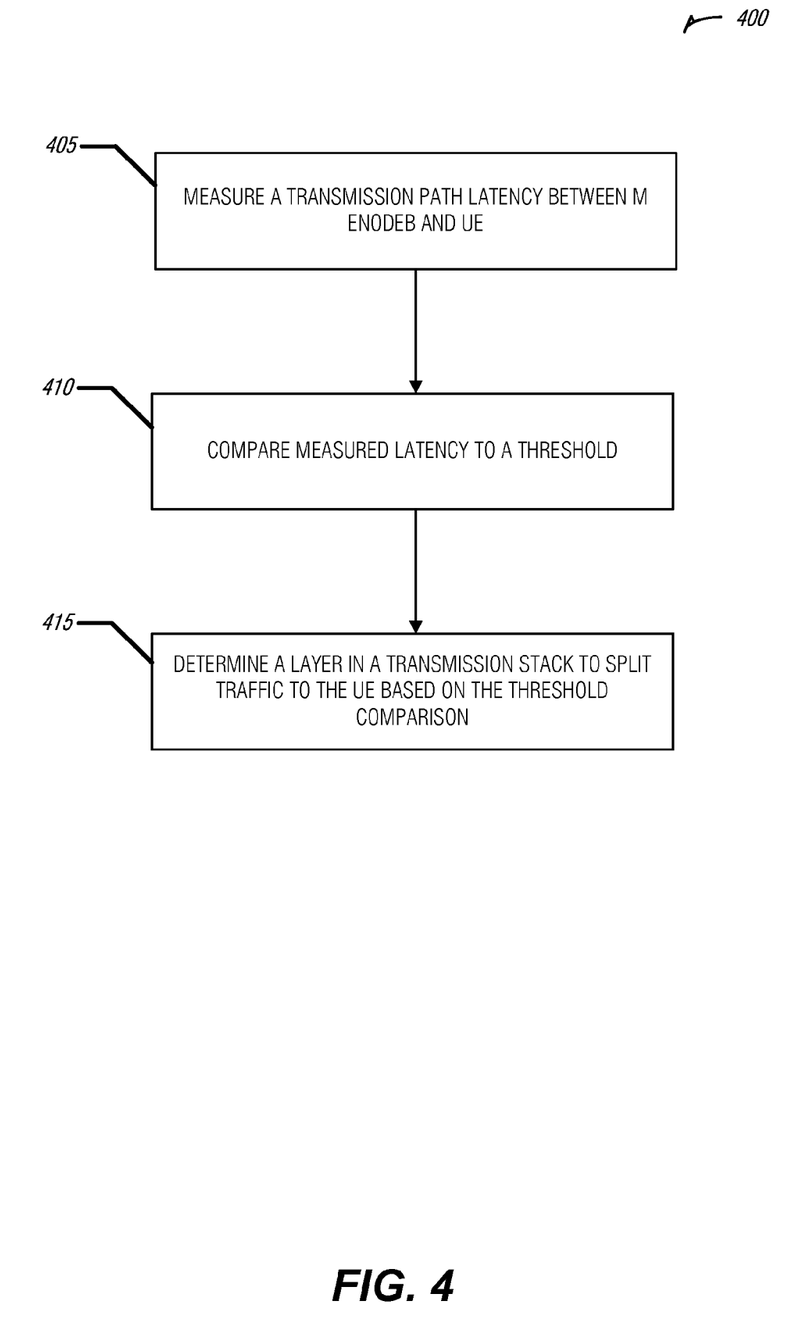
FIG. 4 illustrates a flow diagram of an example of a method for traffic splitting based on latency between cells, according to an embodiment.

FIG. 4 illustrates a flow diagram of an example of a method 400 for traffic splitting based on latency between cells.

At operation 405, a transmission path latency may be measured for a portion of a transmission path between the eNodeB and user equipment (UE) via a secondary eNodeB when the UE is dually connected to both the eNodeB and the secondary eNodeB. In an example, measuring the transmission path latency may include sending a ping message over the portion of the transmission path and receiving a response to the ping message. In an example, the response to the ping message may include a calculated latency by an end-point-recipient (e.g., the entity ultimately receiving the ping as authored by the eNodeB). In an example, the end-point-recipient may be the UE. In an example, the end-point-recipient may be the SeNodeB. In an example, the ping message may be a PDCP packet with a start time stamp.

At operation 410, the transmission path latency may be compared to a threshold. In an example, comparing the transmission path latency to the threshold may include determining that the transmission path latency is greater than the threshold. In an example, comparing the transmission path latency to the threshold may include determining that the transmission path latency is less-than-or-equal-to the threshold.

At operation 415, a layer in a transmission stack to split traffic to the UE may be determined based on the comparison of the transmission path latency to the threshold. As noted above, the traffic being split is between the eNodeB and the secondary eNodeB. In an example, the layer of the transmission stack may be either a PDCP layer or an RLC layer. In an example, determining the layer in the transmission stack includes selecting the PDCP layer when the transmission path latency is greater than the threshold (as determined in operation 410). In an example, determining the layer in the transmission stack includes selecting the RLC layer when the transmission path latency is less-than-or-equal-to the threshold (as determined in operation 410).

In an example, an optional periodic invocation operation may be performed. The periodic invocation operation may include invoking, periodically, operations 405, 410, and 415. Thus, the adaptive bearer splitting discussed above may be accomplished.

Figure 5:
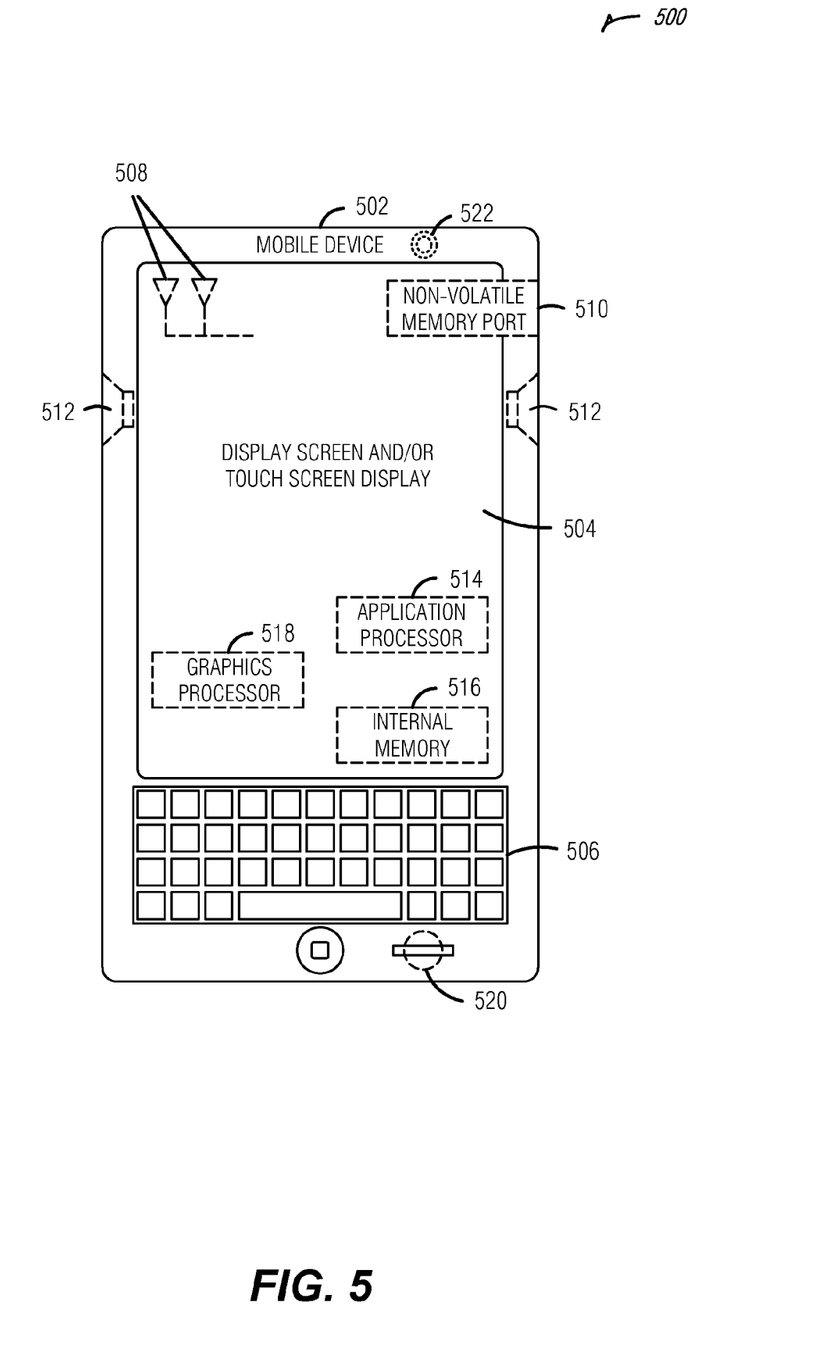
FIG. 5 illustrates an example mobile client device, according to an embodiment.

FIG. 5 provides an example illustration of a mobile device 500, such as a user equipment (UE), a mobile station (MS), a mobile wireless device, a mobile communication device, a tablet, a handset, or other type of mobile wireless computing device. The mobile device 500 may include one or more antennas 508 within housing 502 that are configured to communicate with a hotspot, base station (BS), an evolved NodeB (eNodeB), or other type of WLAN or WWAN access point. The mobile device may be configured to communicate using multiple wireless communication standards, including standards selected from 3GPP LTE/LTE-A, WiMAX, High Speed Packet Access (HSPA), Bluetooth, and Wi-Fi standard definitions. The mobile device 500 may communicate using separate antennas for each wireless communication standard or shared antennas for multiple wireless communication standards. The mobile device 500 may communicate in a WLAN, a WPAN, and/or a WWAN.

FIG. 5 also provides an illustration of a microphone 520 and one or more speakers 512 that may be used for audio input and output from the mobile device 500. A display screen 504 may be a liquid crystal display (LCD) screen, or other type of display screen such as an organic light emitting diode (OLED) display. The display screen 504 may be configured as a touch screen. The touch screen may use capacitive, resistive, or another type of touch screen technology. An application processor 514 and a graphics processor 518 may be coupled to internal memory 516 to provide processing and display capabilities. A non-volatile memory port 510 may also be used to provide data input/output options to a user. The non-volatile memory port 510 may also be used to expand the memory capabilities of the mobile device 500. A keyboard 506 may be integrated with the mobile device 500 or wirelessly connected to the mobile device 500 to provide additional user input. A virtual keyboard may also be provided using the touch screen. A camera 522 located on the front (display screen) side or the rear side of the mobile device 500 may also be integrated into the housing 502 of the mobile device 500.

Figure 6:
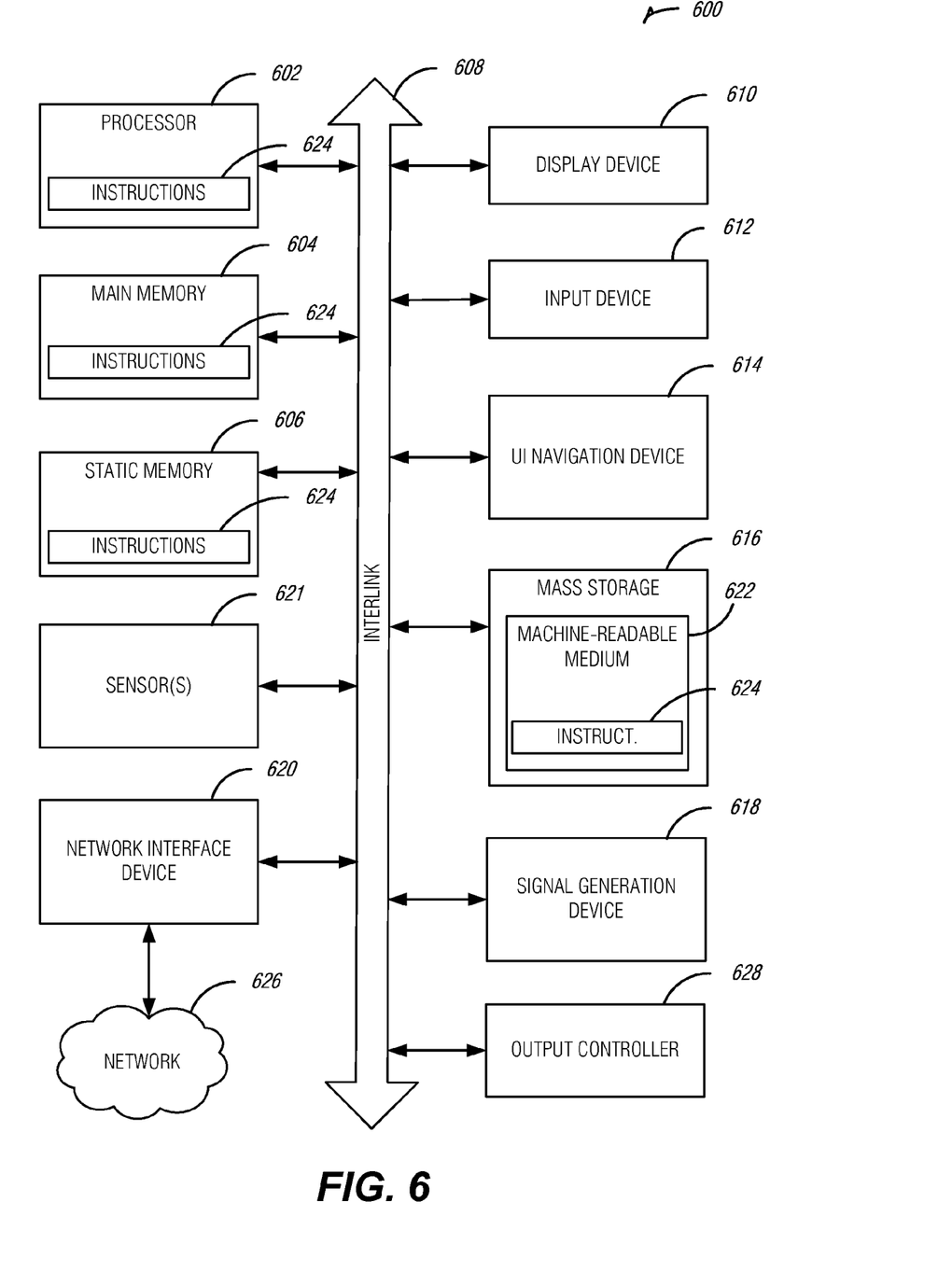
FIG. 6 is a block diagram illustrating an example of a machine upon which one or more embodiments may be implemented.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608. The machine 600 may further include a display unit 610, an alphanumeric input device 612 (e.g., a keyboard), and a user interface (UI) navigation device 614 (e.g., a mouse). In an example, the display unit 610, input device 612 and UI navigation device 614 may be a touch screen display. The machine 600 may additionally include a storage device (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

While the machine readable medium 622 is illustrated as a single medium, the term "machine readable medium" may include a single medium or multiple media (e.g., a centralized or distributed database, and/or associated caches and servers) configured to store the one or more instructions 624.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 620 may include one or more physical jacks (e.g., Ethernet, coaxial, or phone jacks) or one or more antennas to connect to the communications network 626. In an example, the network interface device 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 600, and includes digital or analog communications signals or other intangible medium to facilitate communication of such software.

Additional Notes

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An eNodeB for traffic splitting based on latency between cells, the eNodeB comprising:
   a latency testing module to measure a transmission path latency for a portion of a transmission path between the eNodeB and a user equipment (UE) via a secondary eNodeB when the UE is dually connected to both the eNodeB and the secondary eNodeB;
   a latency calculation module to compare the transmission path latency to a threshold, wherein to compare the transmission path latency to the threshold includes a determination that the transmission path latency is greater than the threshold; and
   a traffic splitting module to determine a layer in a transmission stack to split traffic to the UE based on the comparison of the transmission path latency to the threshold, the traffic being split between the eNodeB and the secondary eNodeB, wherein the layer of the transmission stack is either a packet data convergence protocol (PDCP) layer or a radio link control (RLC) layer, and wherein to determine the layer in the transmission stack includes a selection of the PDCP layer.

2. The eNodeB of claim 1, wherein to measure the transmission path latency includes the latency testing module to:

send a ping message over the portion of the transmission path; and receive a response to the ping message.

3. The eNodeB of claim 2, wherein the response to the ping message includes a calculated latency by an end-point-recipient.

4. The eNodeB of claim 3, wherein the end-point-recipient is the UE.

5. The eNodeB of claim 3, wherein the end-point-recipient is the secondary eNodeB.

6. The eNodeB of claim 2, wherein the ping message is a PDCP packet with a start time stamp.

7. The eNodeB of claim 1, wherein the eNodeB is the termination of an S1-U interface from a service gateway (S-GW) of a third generation partnership project (3GPP) long term evolution (LTE) family of standards compliant cellular network.

8. The eNodeB of claim 1, comprising a adaption module to periodically invoke the latency testing module, the latency calculation module, and the traffic splitting module.

9. A method performed by an eNodeB for traffic splitting based on latency between cells, the method comprising:

measuring a transmission path latency for a portion of a transmission path between the eNodeB and a user equipment (UE) via a secondary eNodeB when the UE is dually connected to both the eNodeB and the secondary eNodeB;

comparing the transmission path latency to a threshold, wherein comparing the transmission path latency to the threshold includes determining that the transmission path latency is greater than the threshold; and determining a layer in a transmission stack to split traffic to the UE based on the comparison of the transmission path latency to the threshold, the traffic being split between the eNodeB and the secondary eNodeB, wherein the layer of the transmission stack is either a packet data convergence protocol (PDCP) layer or a radio link control (RLC) layer, and wherein determining the layer in the transmission stack includes selecting the PDCP layer.

10. The method of claim 9, wherein measuring the transmission path latency includes:

sending a ping message over the portion of the transmission path; and receiving a response to the ping message.

11. The method of claim 10, wherein the response to the ping message includes a calculated latency by an end-point-recipient.

12. The method of claim 11, wherein the end-point-recipient is the UE.

13. The method of claim 11, wherein the end-point-recipient is the secondary eNodeB.

14. The method of claim 9, wherein the eNodeB is the termination of an S1-U interface from a service gateway (S-GW) of a third generation partnership project (3GPP) long term evolution (LTE) family of standards compliant cellular network.

15. At least one non-transitory machine readable medium including instructions that, when executed by an eNodeB, cause the eNodeB to perform operations for traffic splitting based on latency between cells, the operations comprising:

measuring a transmission path latency for a portion of a transmission path between the eNodeB and a user equipment (UE) via a secondary eNodeB when the UE is dually connected to both the eNodeB and the secondary eNodeB;

comparing the transmission path latency to a threshold, wherein comparing the transmission path latency to the threshold includes determining that the transmission path latency is greater than the threshold; and determining a layer in a transmission stack to split traffic to the UE based on the comparison of the transmission path latency to the threshold, the traffic being split between the eNodeB and the secondary eNodeB, wherein the layer of the transmission stack is either a packet data convergence protocol (PDCP) layer or a radio link control (RLC) layer, and wherein determining the layer in the transmission stack includes selecting the PDCP layer.

16. The at least one non-transitory machine readable medium of claim 15, wherein measuring the transmission path latency includes: sending a ping message over the portion of the transmission path; and receiving a response to the ping message.

17. The at least one non-transitory machine readable medium of claim 16, wherein the response to the ping message includes a calculated latency by an end-point-recipient.

18. The at least one non-transitory machine readable medium of claim 17, wherein the end-point-recipient is the UE.

19. The at least one non-transitory machine readable medium of claim 17, wherein the end-point-recipient is the secondary eNodeB.

20. The at least one non-transitory machine readable medium of claim 16, wherein the ping message is a PDCP packet with a start time stamp.

21. The at least one non-transitory machine readable medium of claim 15, wherein the eNodeB is the termination of an S1-U interface from a service gateway (S-GW) of a third generation partnership project (3GPP) long term evolution (LTE) family of standards compliant cellular network.

* * * * *